March 19, 1929.   D. S. COLLINS   1,706,145
DIFFERENTIAL PRESSURE DEVICE
Filed Nov. 7, 1925
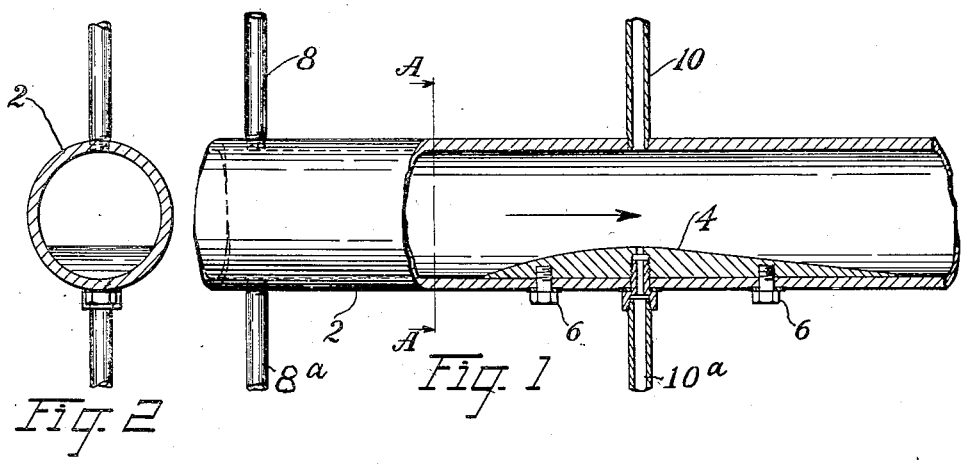
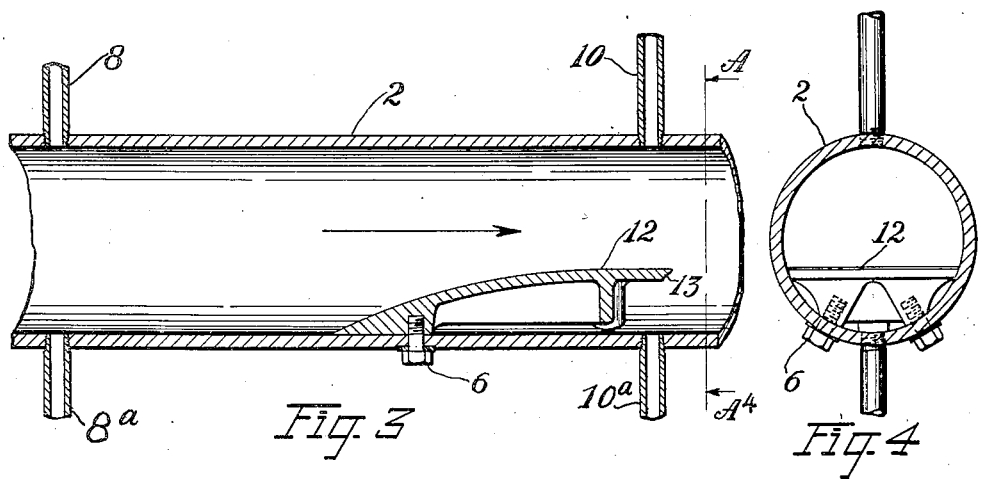
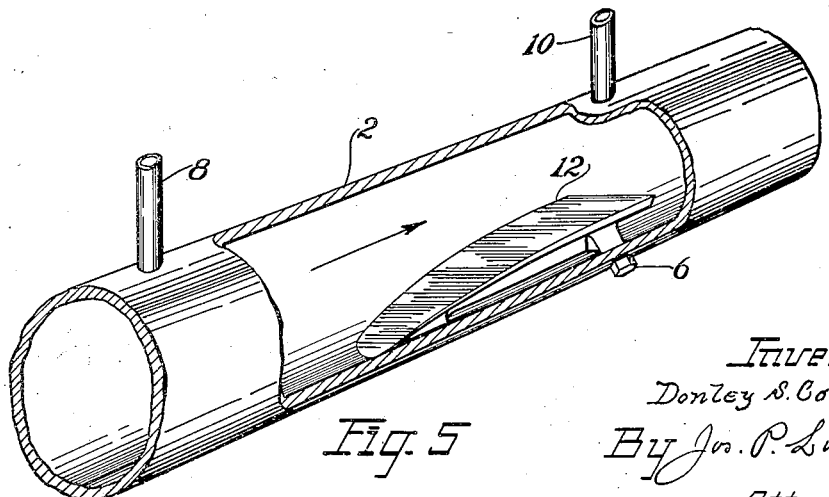
Inventor
Donley S. Collins
By Jos. P. Livermore
Attorney Patented Mar. 19, 1929.

1,706,145

UNITED STATES PATENT OFFICE.

DONLEY S. COLLINS, OF CLEVELAND HEIGHTS, OHIO, ASSIGNOR, BY MESNE ASSIGNMENTS, TO BAILEY METER COMPANY, A CORPORATION OF DELAWARE.

DIFFERENTIAL-PRESSURE DEVICE.

Application filed November 7, 1925. Serial No. 67,651.

This invention relates to a pressure differential device for flow meters and is adapted for use as an essential part of a flow meter wherein the pressure difference caused by fluid flowing past an obstruction is utilized as the basis of measurement of such fluid, the principal purpose of such construction being to give a known and dependable pressure difference for each rate of flow, and especially flow at high rates.

In the patent to E. G. Bailey, No. 1,248,058 of November 27, 1917 is described an orifice plate for flow meters of this general type. Such plates can be readily affixed in a conduit only at the joints of the same, and may require accurate positioning or centering in order to insure the desired results. Other forms of obstructions are known which may be placed between the ends of a given section but these also require accurate centering.

The pressure differential device herein referred to is similar in its principle of operation to a Venturi tube in that it forms a throat or section of reduced cross-sectional area in the pipe which in speeding up the flow gives a reduction in pressure in accordance with the usual laws of the Venturi tube. Instead of forming this reduction equally on all sides of the pipe however, it is herein shown as formed all on one side of the pipe (and preferably in form of a tapered segment of some length), allowing unimpeded flow along the wall at the opposite side of the pipe. This has proven to be a distinct advance in many respects,—principally in the efficiency of operation, by reducing the pressure loss, by giving a large capacity, and by giving a minimum of variation in the coefficient for the device though the downstream connection be made at some distance from the vena contracta. This construction has among its advantages the following; minimum pressure loss and high capacity, as just mentioned; the device may be positioned or placed at a point in a conduit remote from the joints of the same; no accurate centering is necessary as in its preferred form a separate member conforming in curvature to the inner diameter of the pipe or conduit is affixed therein and is thus in effect "self locating", so far as any locating is required; the vena contracta is such that substantially the same pressure extends over a comparatively large area, so that nearly the same pressure difference will be indicated even if the downstream pressure connection is not located with precision; the device restores a large amount of static pressure though creating sufficient differential pressure for the purpose of measuring the flow of fluid; low cost of construction and installation, as will later more fully appear; and because of the foregoing and other peculiar advantages, this device is particularly well adapted for accurately measuring a fluid flowing through a pipe at very high velocities.

In the drawings, Fig. 1 is a longitudinal section of a pipe or duct showing my preferred form of construction; Fig. 2 is a cross sectional view of the pipe and the obstruction taken on line AA of Fig. 1; Fig. 3 is a longitudinal section of a pipe having therein a modified form of obstruction; Fig. 4 is a cross sectional view taken on line $AA^4$ of Fig. 3 and Fig. 5 is a perspective view of a pipe partly broken away looking in the direction nearly opposite to that of Fig. 4. The large arrows in Figs. 1, 3 and 5 indicate the direction of flow of the stream in each case.

Referring to Figs. 1 and 3,—2 represents a suitable pipe or conduit and 4 an obstruction in the same. In this case the obstruction shown in separable from the pipe though it is, of course, contemplated that the obstruction, if desired, may be made integral with the pipe. The obstruction is held in a fixed position with reference to the pipe 2 by means of cap screws 6. This construction readily lends itself to an absolutely steam tight installation which may be secured by simply welding the heads of the cap screws to the pipe. In these figures are shown pressure connections 8 and 10, 8 being the upstream connection, and 10 being the downstream connection adjacent the vena contracta. The pressure connections $8^a$ and $10^a$ are alternate pressure connections which may be provided in lieu of 8 and 10. It is contemplated in this invention that the pressure connections may enter the pipe at any point in the inner wall of the same, providing the downstream connection is correctly located with reference to the vena contracta, and the upstream connection at a point suitably distant therefrom for taking the upstream or higher pressure. The preferred form of obstruction 4 is of segmental cross section and tapers towards both ends as will be clearly seen from Fig. 1 and Fig. 2, thus presenting to the stream a gradually restricted passage bounded by the wall of the pipe and the deflecting surface of the obstruction. The present invention has a further advantage because the flow of the stream is bounded on one side by the wall of the pipe, in that the bottom of the passage may be kept open in case water carrying sediment is being metered. In this connection Figs. 1 or 3 may be considered as plan views instead of in elevation, or the segment may be attached to the upper part of the pipe leaving the entire lower area open, as for example if the figures of the drawing be viewed upside down. Figs. 3, 4 and 5 show a modified form of construction which gives results similar in all essential respects to the construction shown in Figs. 1 and 2, and is better adapted for certain installations. The cap screws 6 hold in the conduit the tapered segmental obstruction 12 which terminates at its downstream and in a lip 13, the lip being a desirable though not an essential feature. The Figures 3 and 4 also show alternate pressure connections as were described in connection with Figs. 1 and 2. It is not necessary that more than one pair of pressure connections be provided in a given case, though it can be done if so desired. Two sets of pressure connections are shown herein (in Figs. 1-4) simply for the purpose of disclosing that the pressure connections may be affixed at various points in the inner wall, as before mentioned.

Further as to the practical advantages of construction and installation, it may be said of this invention that the initial cost is lower because of simplicity and ease of manufacture and installation. A segment can be located in a section of pipe where there is no flange, or where no available flange is suitable for an orifice or flow nozzle. This condition frequently arises where the only flange in a section of piping is at the inlet to an L, T, separator or other fitting that would have a serious effect on an orifice or flow nozzle. In this case the segment may be set back a few pipe diameters from the flange and give accurate results.

It is readily seen that the above described constructions as a matter of manufacture, installation and adjustment, are extremely practical, and the results therefrom represent a distinct advance over (and are in no way undesirably affected by the radical departures from) constructions in use and known today.

Though in Figs. 3-5, inclusive, a skeleton obstruction is shown, instead of a solid obstruction (as shown in Figs. 1 and 2), it will be obvious that this is a mere detail of construction and I have treated the solid and skeleton constructions as one and the same in the specification and claims because they are effectively the same. I do not therefore limit the claims, or any of them, to either a solid or skeleton construction.

I claim:—

1. The combination with a circular conduit through which a fluid to be metered flows, of a pressure difference creating device in said conduit comprising a tapered body which is substantially flat on its upper surface and rounded on its lower surface to conform to the contour of the conduit, said rounded surface being directly in engagement with the conduit, and means for fastening said body to the wall of the conduit, said means engaging with the lower rounded portion of said body.

2. The combination with a circular conduit through which a fluid to be metered flows, of a pressure difference creating device in said conduit, comprising a tapered substantially flat plate and webs beneath the plate which provide feet for supporting the plate in the conduit, said webs being circular in outline to conform to the contour of the conduit and said feet engaging directly with the wall of the conduit, and means for fastening the feet formed by the web to the wall of the conduit.

DONLEY S. COLLINS.